United States Patent
Dirsa et al.

(10) Patent No.: US 9,743,711 B2
(45) Date of Patent: Aug. 29, 2017

(54) SOLE ASSEMBLY WITH PLURAL PORTIONS THAT COOPERATIVELY DEFINE CHAMBER

(71) Applicant: NIKE, Inc., Beaverton, OR (US)

(72) Inventors: David J. Dirsa, North Andover, MA (US); Haim Horesh, Ho Chi Minh (VN); Gary M. Peters, Newberg, OR (US)

(73) Assignee: NIKE, Inc., Beaverton, OR (US)

( * ) Notice: Subject to any disclaimer, the term of this patent is extended or adjusted under 35 U.S.C. 154(b) by 275 days.

(21) Appl. No.: 13/756,297

(22) Filed: Jan. 31, 2013

(65) Prior Publication Data

US 2014/0208610 A1 Jul. 31, 2014

(51) Int. Cl.
| | |
|---|---|
| *A43B 13/18* | (2006.01) |
| *A43B 13/12* | (2006.01) |
| *B29C 33/48* | (2006.01) |
| *B29C 33/50* | (2006.01) |
| *A43B 13/14* | (2006.01) |
| *A43B 13/20* | (2006.01) |
| *B29D 35/14* | (2010.01) |

(52) U.S. Cl.
CPC ............ *A43B 13/125* (2013.01); *A43B 13/14* (2013.01); *A43B 13/20* (2013.01); *B29C 33/485* (2013.01); *B29C 33/505* (2013.01); *B29D 35/142* (2013.01)

(58) Field of Classification Search
CPC .... B29C 33/485; B29C 33/505; A43B 13/125
USPC ............................................... 156/242, 245
See application file for complete search history.

(56) References Cited

U.S. PATENT DOCUMENTS

| 547,645 A | 10/1895 | Lacroix |
|---|---|---|
| 2,020,240 A | 11/1934 | Cochran |
| 2,599,740 A | 6/1952 | Beveridge |
| (Continued) | | |

FOREIGN PATENT DOCUMENTS

| DE | 3216299 | 10/1983 |
|---|---|---|
| JP | 10155510 | 6/1998 |
| WO | WO8703789 | 7/1987 |

OTHER PUBLICATIONS

Non Final Office Action mailed Apr. 28, 2015 for U.S. Appl. No. 13/756,189, filed Jan. 31, 2013.

*Primary Examiner* — Philip Tucker
*Assistant Examiner* — John Blades
(74) *Attorney, Agent, or Firm* — Honigman Miller Schwartz and Cohn LLP; Matthew H. Szalach; Jonathan P. O'Brien

(57) ABSTRACT

A method of forming a sole assembly of an article of footwear including an interior space and an exterior surface includes providing a first portion of the sole assembly. The first portion includes a first surface that at least partially defines the interior space and a first chamber surface that opposes the first surface. The first portion is made from a first material. The method also includes providing a second portion of the sole assembly that includes a second surface that at least partially defines the exterior surface of the article of footwear and a second chamber surface that opposes the second surface. The second portion is made from a second material that is different from the first material. The method additionally includes operably securing the first and second portions such that the first chamber surface and the second chamber surface cooperate to at least partially define a chamber.

20 Claims, 5 Drawing Sheets

(56) References Cited

U.S. PATENT DOCUMENTS

| | | |
|---|---|---|
| 3,012,342 A | 7/1960 | Ramirez |
| 3,044,190 A | 7/1962 | Urbany |
| 3,100,354 A | 8/1963 | Lombard |
| 3,216,299 A | 11/1965 | Stoeckli |
| 3,290,801 A | 12/1966 | Bente |
| 3,608,215 A | 9/1971 | Fukuoka |
| 3,629,962 A | 12/1971 | Brock |
| 4,012,854 A | 3/1977 | Berend et al. |
| 4,129,951 A | 12/1978 | Petrosky |
| 4,170,078 A | 10/1979 | Moss |
| 4,223,455 A | 9/1980 | Vermeulen |
| 4,229,889 A | 10/1980 | Petrosky |
| 4,397,104 A | 8/1983 | Doak |
| 4,451,994 A | 6/1984 | Fowler |
| 4,462,171 A | 7/1984 | Whispell |
| 4,468,869 A | 9/1984 | Fukuoka |
| 4,499,672 A | 2/1985 | Kim |
| 4,547,978 A | 10/1985 | Radford |
| 4,602,441 A | 7/1986 | El Sakkaf |
| 4,635,384 A | 1/1987 | Huh et al. |
| 4,670,995 A | 6/1987 | Huang |
| 4,753,022 A | 6/1988 | Gasbarro |
| 4,833,795 A | 5/1989 | Diaz |
| 4,845,861 A | 7/1989 | Moumdjian |
| 4,878,300 A | 11/1989 | Bogaty |
| 4,939,851 A | 7/1990 | Miller |
| 4,999,931 A | 3/1991 | Vermeulen |
| 5,199,191 A | 4/1993 | Moumdjian |
| 5,400,526 A | 3/1995 | Sessa |
| 5,515,622 A | 5/1996 | Lee |
| 5,572,804 A * | 11/1996 | Skaja et al. .................. 36/29 |
| 5,794,359 A | 8/1998 | Jenkins et al. |
| 5,956,869 A | 9/1999 | Kim |
| 6,098,313 A | 8/2000 | Skaja |
| 6,266,897 B1 | 7/2001 | Seydel et al. |
| 6,305,099 B1 | 10/2001 | Chu |
| 6,751,890 B1 | 6/2004 | Tsai |
| 6,796,056 B2 | 9/2004 | Swigart |
| 7,254,906 B2 | 8/2007 | Morris et al. |
| 7,571,555 B1 | 8/2009 | Powell, Sr. |
| 2004/0154189 A1 | 8/2004 | Wang |
| 2006/0236562 A1 | 10/2006 | Wang |
| 2007/0101612 A1 | 5/2007 | Kilgore |
| 2008/0172904 A1 | 7/2008 | Pelsue et al. |
| 2008/0178496 A1 | 7/2008 | Lin et al. |
| 2008/0184600 A1 | 8/2008 | Yang |
| 2009/0056171 A1 | 3/2009 | Lin |
| 2009/0126230 A1 | 5/2009 | McDonald et al. |
| 2009/0241372 A1 | 10/2009 | Ryu |
| 2010/0083541 A1 | 4/2010 | Baucom et al. |
| 2010/0098797 A1 * | 4/2010 | Davis et al. ............ 425/129.2 |
| 2010/0251565 A1 | 10/2010 | Litchfield et al. |
| 2012/0260524 A1 | 10/2012 | Izquieta |

* cited by examiner

SOLE ASSEMBLY WITH PLURAL PORTIONS THAT COOPERATIVELY DEFINE CHAMBER

FIELD

The present disclosure relates to a sole assembly for an article of footwear and, more particularly, relates to a sole assembly having plural portions that cooperatively define a chamber.

BACKGROUND

Articles of footwear can include an upper, a midsole, and an outsole. The upper can include layers or sections of material that wrap about a substantial portion of the superior, anterior, posterior, medial and lateral portions of the wearer's foot. The upper can also include laces, straps, or the like for securing the footwear to the wearer's foot. The outsole can be a unitary piece of relatively high-friction material that provides traction for the footwear. Also, the midsole can include foam that is disposed between the outsole and the upper for providing cushioned support for the wearer.

In some cases, footwear can additionally include a bladder that contains a fluid, such as a gas or gel. The bladder can be embedded within the midsole, and weight of the wearer and other loading on the bladder can cause the fluid to displace within the bladder. As such, the bladder can resiliently deform and conform to the wearer's foot in order to provide better support and comfort than some midsoles made entirely out of foam. Also, the bladder can dampen or attenuate shock loads or other loads during jumping, running, and other activities to provide better cushioning.

Although conventional footwear with bladders have been adequate for their intended purposes, they do suffer from certain disadvantages. For instance, manufacturing of the footwear can be significantly expensive and complicated. For instance, the bladder itself increases the part count of the footwear. Also, the bladder is typically manufactured separately from the rest of the sole assembly, and then the bladder is assembled into the sole assembly. As such, the bladder can increase part costs and manufacturing costs.

Furthermore, sole assemblies that include fluid-filled bladders can significantly increase the weight of the sole structure, which can hinder the wearer's running, jumping, or other movements. Even further, such sole assemblies can be difficult to recycle because the assembly includes multiple parts as discussed above.

SUMMARY

The present disclosure overcomes these and other shortfalls of conventional sole assemblies.

A method of forming a sole assembly of an article of footwear that includes an interior space that receives a foot of a wearer is disclosed. The article of footwear also includes an exterior surface. The method includes providing a first portion of the sole assembly, wherein the first portion includes a first surface that at least partially defines the interior space. The first portion also includes a first chamber surface that opposes the first surface. The first portion is made from a first material. The method also includes providing a second portion of the sole assembly. The second portion includes a second surface that at least partially defines the exterior surface of the article of footwear. The second portion also includes a second chamber surface that opposes the second surface. The second portion is made from a second material that is different from the first material. The method additionally includes operably securing the first portion to the second portion such that the first chamber surface and the second chamber surface cooperate to at least partially define a substantially sealed chamber within the sole assembly.

Additionally, a sole assembly for an article of footwear that includes an interior space that receives a foot of a wearer is disclosed. The article of footwear also includes an exterior surface. The sole assembly includes a first portion that includes a first surface that at least partially defines the interior space, and the first portion also includes a first chamber surface that opposes the first surface. The first portion further includes a first mating surface. The first portion is made from a first material. The sole assembly also includes a second portion that includes a second surface that at least partially defines the exterior surface of the article of footwear. The second portion also includes a second chamber surface that opposes the second surface. The second portion further includes a second mating surface that is mated to the first mating surface such that the first chamber surface and the second chamber surface cooperate to at least partially define a substantially sealed chamber within the sole assembly. The second portion is made from a second material that is different from the first material.

This section provides a general summary of the disclosed sole assembly and is not a comprehensive disclosure of the full scope or all of the features of the present disclosure. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 4A and 4B illustrate a middle mold member used to form the sole assembly of FIGS. 1A and 1B, wherein FIG. 4A is a top perspective view of the middle mold member, and wherein FIG. 4B is a bottom perspective view of the middle mold member;

FIGS. 6A and 6B is a section view of a mold assembly of the mold members of FIGS. 3-5, wherein FIG. 6A is a section view of the first, middle, and second mold members during use, and wherein FIG. 6B is a section view of the first and second mold members during use.

Corresponding reference numerals indicate corresponding parts throughout the several views of the drawings.

DETAILED DESCRIPTION

Example embodiments will now be described more fully with reference to the accompanying drawings.

Figure 1A:
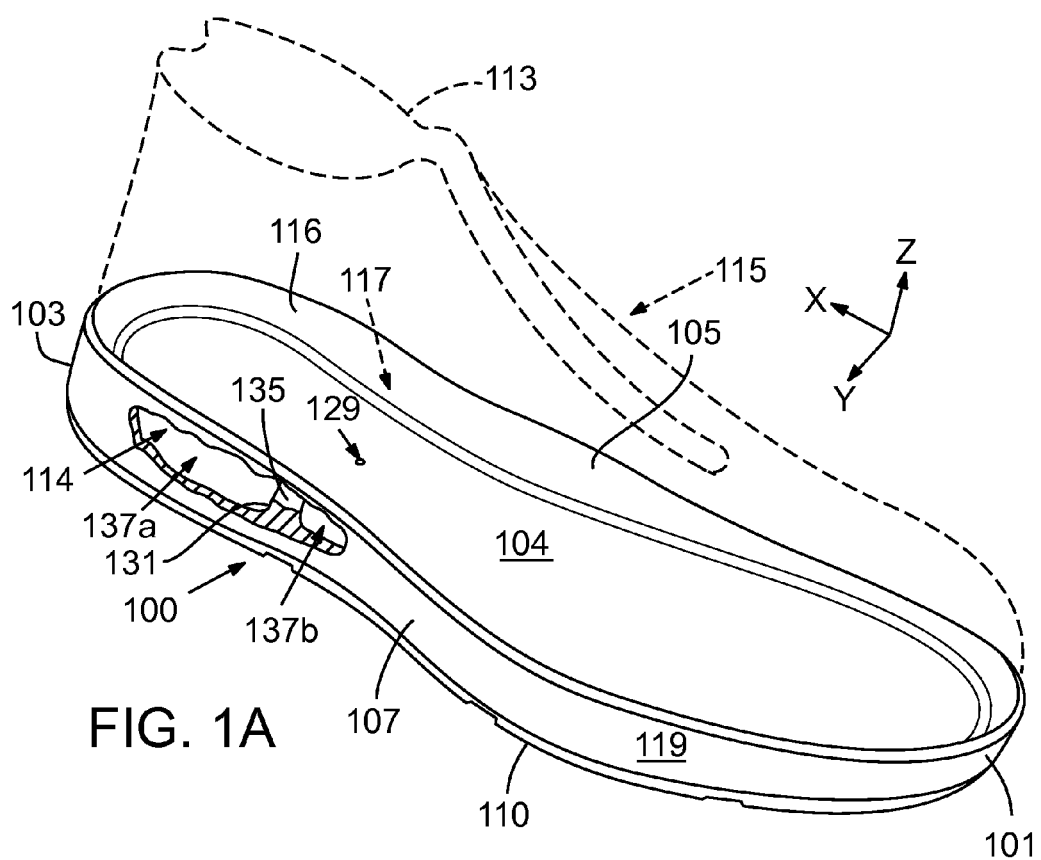
FIGS. 1A and 1B illustrate a top and bottom perspective view, respectively, of a sole assembly according to exemplary embodiments of the present disclosure.
Figure 1B:
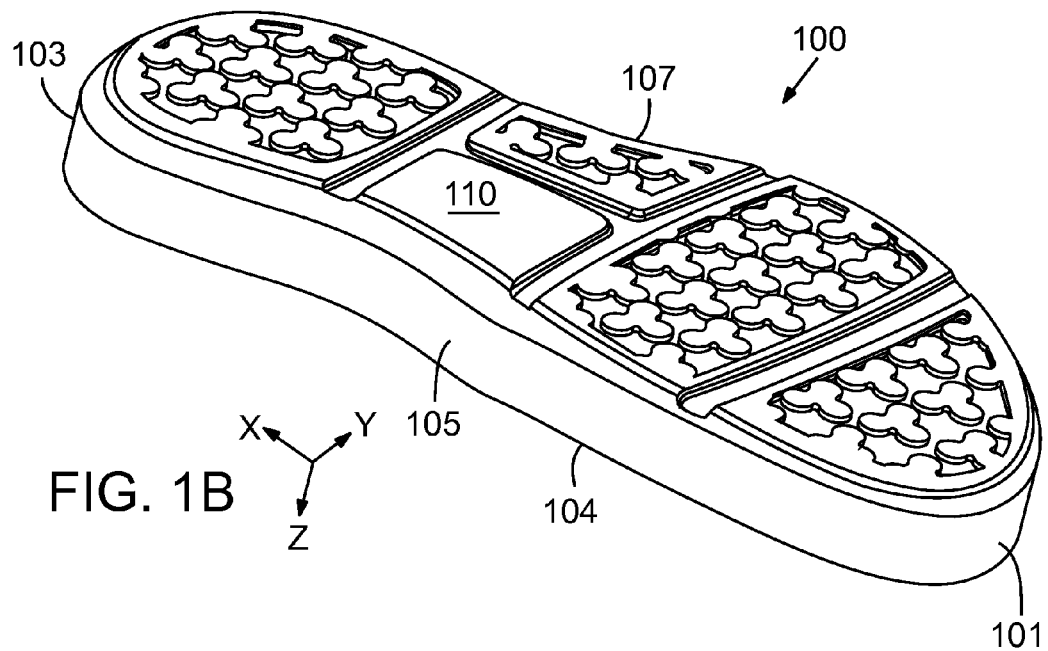

Referring initially to FIGS. 1A and 1B, a sole assembly 100 is illustrated according to exemplary embodiments of the present disclosure. The sole assembly 100 includes various features that will be discussed in detail below. Although a sole assembly 100 for a right foot is illustrated, it will be appreciated that the sole assembly 100 can be configured for a left foot without departing from the scope of the present disclosure.

The sole assembly 100 can be relatively flat and can include an anterior region 101, a posterior region 103, a medial region 105, and a lateral region 107. The sole assembly 100 can also include a first surface 104 and a second surface 110 that are opposite each other (i.e., face away from each other) in a superior/inferior direction Z. The first and second surfaces 104, 110 can extend generally in lateral directions X, Y between the anterior, posterior, medial, and lateral regions 101, 103, 105, 107. It will be appreciated that the sole assembly 100 can extend along any suitable portion of the length of the wearer's foot. For instance, the sole assembly 100 can extend only along the heel region portion of the wearer's foot without extending to the forefoot region of the wearer's foot, or vice versa.

The sole assembly 100 can be operably coupled (e.g., lasted, etc.) to an upper 113 (shown in phantom in FIG. 1A) to form an article of footwear 115, such as a shoe, a boot, a sandal, etc. Once attached to the upper 113, the first surface 104 and the upper 113 can cooperate to define an interior space 117 of the footwear 115. The wearer's foot (not shown) can be received within the space 117 such that the upper 113 extends over (superior to) the wearer's foot and the sole assembly 100 extends below (inferior to) the wearer's foot. The first surface 104 can be disposed directly beneath and can abut the wearer's foot or can abut a sock that is worn on the wearer's foot. Also, a separate insole (not shown) can cover the first surface 104 in some embodiments to be disposed between the first surface 104 and the wearer's foot. As shown, the first surface 104 can be contoured (e.g., three-dimensionally contoured) to conform to the anatomical contours of the wearer's foot. For instance, the first surface 104 can contour superiorly at the periphery or lip 116 to substantially cup the wearer's foot.

The second surface 110 can at least partially define an exterior surface 119 (e.g., an outsole surface) of the footwear 115. Specifically, the exterior surface 119 can contact the ground (e.g., pavement, grass, dirt, etc.) during running, walking, or other movement. The second surface 110 can also include treads, projections, spikes, cleats, or other features that increase traction on the ground.

Figure 2A:
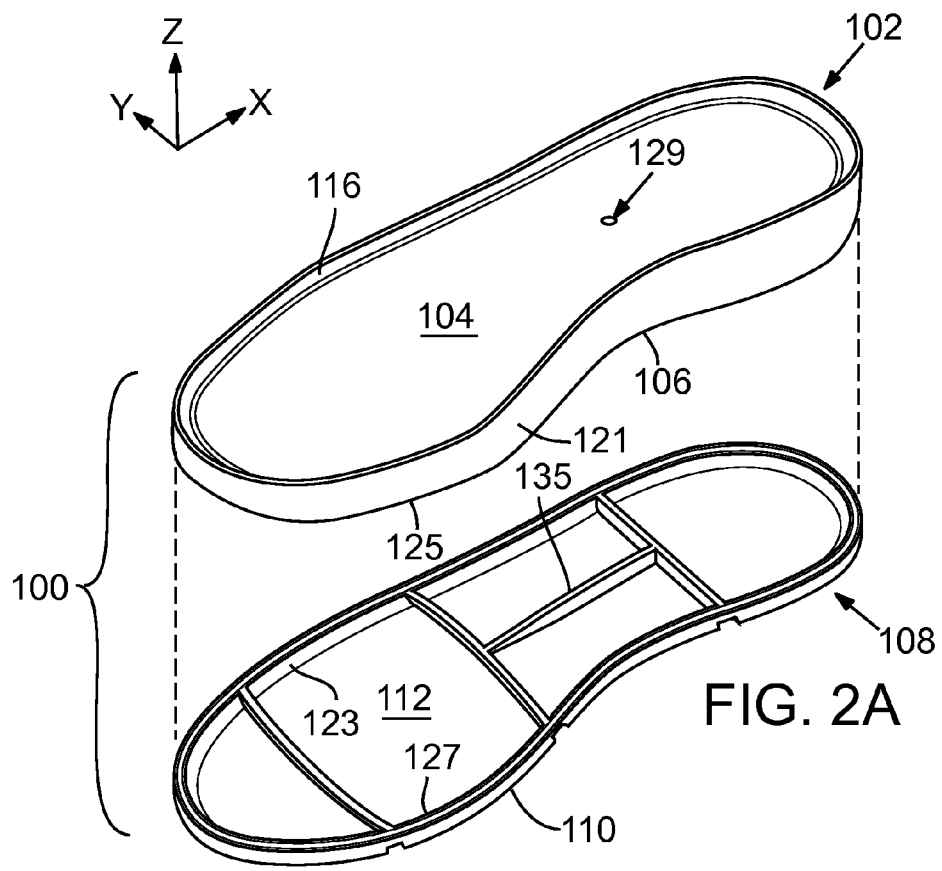
FIGS. 2A and 2B illustrate top and bottom exploded perspective views, respectively, of the sole assembly of FIGS. 1A and 1B.
Figure 2B:
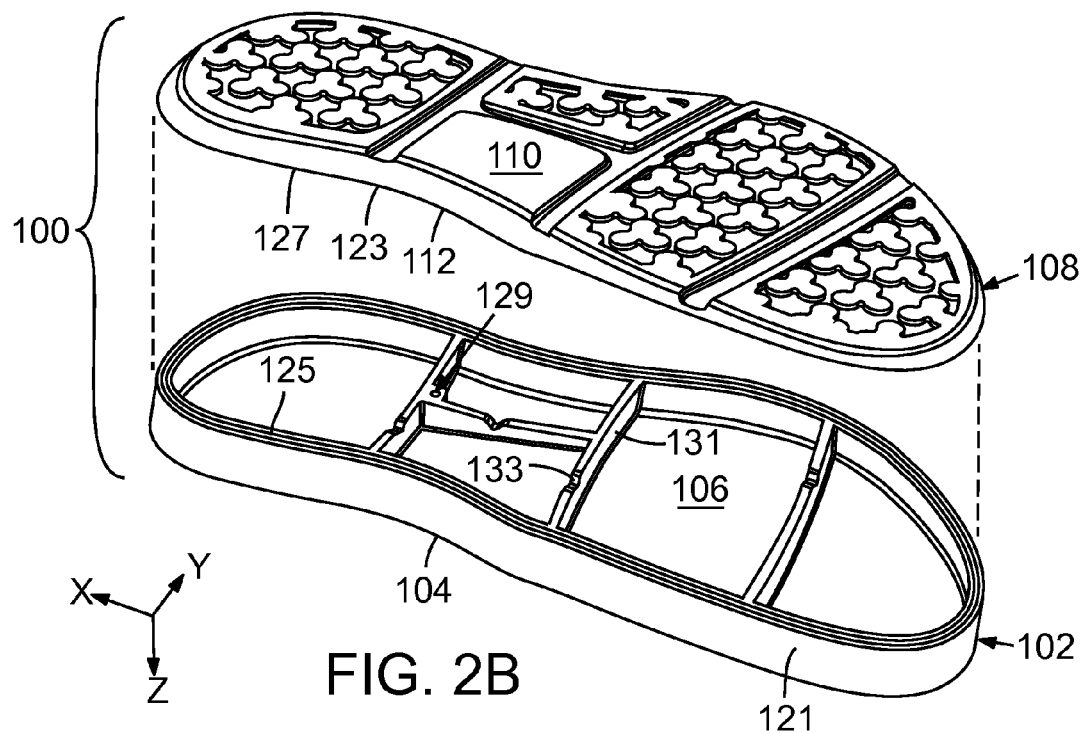

Referring now to FIGS. 2A and 2B, the sole assembly 100 is illustrated in exploded perspective views. As shown, the sole assembly 100 can include a plurality of portions 102, 108. There can be any number of portions 102, 108, but in the illustrated embodiments, there is a first portion 102 and a second portion 108. The first portion 102 and the second portion 108 can each be monolithic (uni-body construction), can be formed in any suitable manner (e.g., molding), and can be formed out of any suitable material. The first and second portion 102, 108 can both extend in the lateral directions X, Y between the anterior, posterior, medial, and lateral regions 101, 103, 105, 107 (FIGS. 1A and 1B). Also, the first and second portions 102, 108 can be layered over each other in the inferior/superior direction Z.

As shown in FIGS. 2A and 2B, the first portion 102 can include the first surface 104, and the first portion 102 can also include a first chamber surface 106 (FIG. 2B) that is opposite the first surface 104. Furthermore, the second portion 108 can include the second surface 110, and the second portion 108 can also include a second chamber surface 112 (FIG. 2A) that is opposite the second surface 110. The first and second chamber surfaces 106, 112 can be substantially flat and can extend in the lateral directions X, Y between the anterior, posterior, medial, and lateral regions 101, 103, 105, 107. Also, the first portion 102 can include an inferiorly extending peripheral wall 121 that terminates at a first mating surface 125, and the second portion 108 can include a superiorly extending peripheral wall 123 that terminates at a second mating surface 127.

The first and second mating surfaces 125, 127 can be layered over each other and attached together (mated together) in any suitable means (e.g., plastic molding, adhesives, fasteners, etc.) to secure the first and second portions 102, 108 together. Once attached, a substantially sealed chamber 114 (FIG. 1A) can be defined between the first and second portions 102, 108. The first chamber surface 106 and the second chamber surface 112 can at least partially define the boundaries of the chamber 114. In the illustrated embodiments, the chamber 114 extends transversely along substantially the entire length of the sole assembly 100 between the anterior, posterior, medial, and lateral regions 101, 103, 105, 107; however, the chamber 114 can extend across any portion of the sole assembly 100. As will be discussed, the chamber 114 can deflect to attenuate shock loads in the sole assembly 100, provide greater comfort, etc.

The chamber 114 can contain a fluid, such as air, another gas, a gel, etc. The fluid can be supplied into the chamber 114 to increase pressure therein, or fluid can be removed to decrease pressure in the chamber 114. For instance, the sole assembly 100 can further include a valve assembly 129 that provides a selectively open fluid flow path between the chamber 114 and an area outside the chamber 114. Thus, pressure can be changed in the chamber 114 via the valve assembly 129. In some embodiments, the valve assembly 129 is operably supported only by the first portion 102 and extends between the first surface 104 and the first chamber surface 106. In additional embodiments, the valve assembly 129 is operably supported by the second portion 108. The valve assembly 129 can be a one-way valve such that fluid only flows in one direction therethrough. For instance, the valve assembly 129 can be used only to introduce additional fluid into the chamber 114 to increase pressure therein, or vice versa. However, the valve assembly 129 could be a two-way valve in additional embodiments such that fluid can be selectively and alternately moved into and out of the chamber 114.

In some embodiments, the first portion 102 can include one or more first rails 131 (FIG. 2B), and the second portion 108 can include one or more second rails 135 (FIG. 2A). The rails 131, 135 can extend longitudinally in one or both transverse directions X, Y or be configured in any angle or shape with respect to each other such as a hexagonal pattern, herring bone pattern, or the like. Also, the first rails 131 can extend inferiorly from the first chamber surface 106, and the second rails 135 can extend superiorly from the second chamber surface 112. In the embodiments illustrated in FIG. 2B, there are three first rails 131 that extend substantially parallel to the Y-axis between opposing sides of the peripheral wall 121 and one first rail 131 that extends substantially parallel to the X-axis between two other first rails 131. As shown in the embodiments of FIG. 2A, the number and position of the second rails 135 can correspond to that of the first rails 131. In some embodiments, the first rails 131 can be integrally connected to the first chamber surface 106 so as to be monolithic, and the second rails 135 can be integrally connected to the second chamber surface 112 so as to be monolithic.

As shown in FIG. 1A, when the first and second portions 102, 108 are joined together, the first rails 131 can abut and attach to the second rails 135 such that the rails 131, 135 collectively divide the chamber 114 into a plurality of areas 137a, 137b. There can be any suitable number of areas 137a, 137b, and the areas can be included in the forefoot, midfoot, medial, lateral, and/or rearfoot areas). In some embodiments, the rails 131, 135 can be sealed together such that these areas 137a, 137b within the chamber 114 are fluidly disconnected from others. However, in additional embodiments, one or both of the rails 131, 129 can include an opening 133 extending laterally therethrough to provide fluid communication between the areas 137a, 137b of the chamber 114. For instance, as shown in FIG. 2B, the first rails 131 can include one or more notch-like openings 133 that provide fluid communication between the areas 137a, 137b of the chamber 114.

It will be appreciated that the rails 131, 135 can support the first and second portions 102, 108 relative to each other. For instance, the rails 131, 135 can prop the first chamber surface 106 above the second chamber surface 112 to substantially inhibit the chamber 114 from collapsing. Also, it will be appreciated that the sole assembly 100 could include a single rail that extends from only one of the first and second chamber surfaces 106, 112 to abut the other of the first and second chamber surfaces 106, 112. Moreover, the sole assembly 100 could include another type of support member other than the rails 106, 112 for supporting the first and second portions 102, 108 relative to each other. For instance, the sole assembly 100 could include biasing members or tensile elements that bias the portions 102, 108 away from each other, cylindrical columns, posts, or other types of support members that extend between the first and second chamber surfaces 106, 112 and keep the surfaces 106, 112 separated from each other.

The first and second portions 102, 108 can be made out of foam, rubber, a combination of foam and rubber, or any other suitable material. Furthermore, the first and second portions 102, 108 can be made out of different materials from each other. For instance, the first portion 102 can be made out of foam while the second portion 108 can be made out of rubber. Additionally, the first portion 102 and second portion 108 can be made out of different foams with different material properties. Moreover, the first portion 102 and the second portion 108 can be made out of different rubbers with different material properties.

Also, in some embodiments, the material characteristics of the first and second portions 102, 108 can be different from each other. For instance, the first portion 102 and the second portion 108 can have a different durometer, a different resistance to resilient deformation, a different coefficient of friction, different durabilities, and/or other material characteristic difference. In some examples, the material of the second portion 108 is more durable and has a higher coefficient of friction than the material of the first portion 102 such that the second portion 108 performs similar to a traditional outsole. In an additional example, the material of the first portion 102 is softer than the material of the second portion 108 such that the first portion 102 performs similar to a traditional midsole. The softer properties of the first portion 102 can help make the contact between the wearer's foot and the surface 104 of the first portion 102 more comfortable for the wearer during wear. In further examples, the first portion 102 and the second portion 108 differ in impact-attenuating properties. For instance, the first portion 102 can be less resistant to resilient deformation than the second portion 108. It will be appreciated that the first portion 102 and the second portion 108 can have any suitable differences.

Figure 4A:
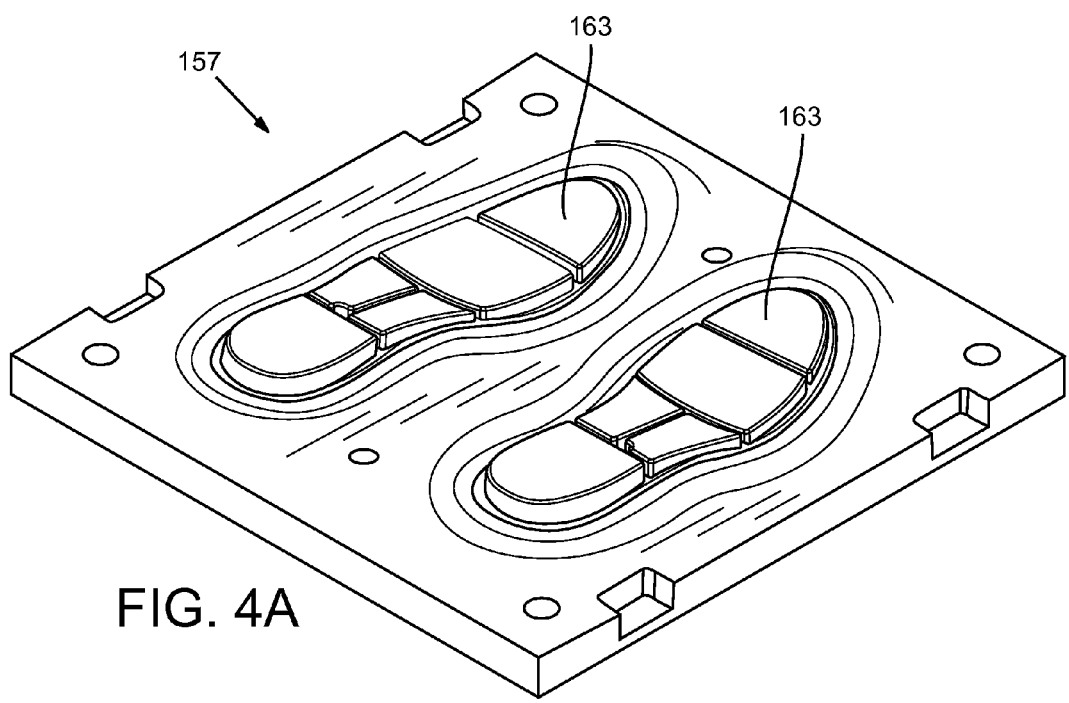
Figure 4B:
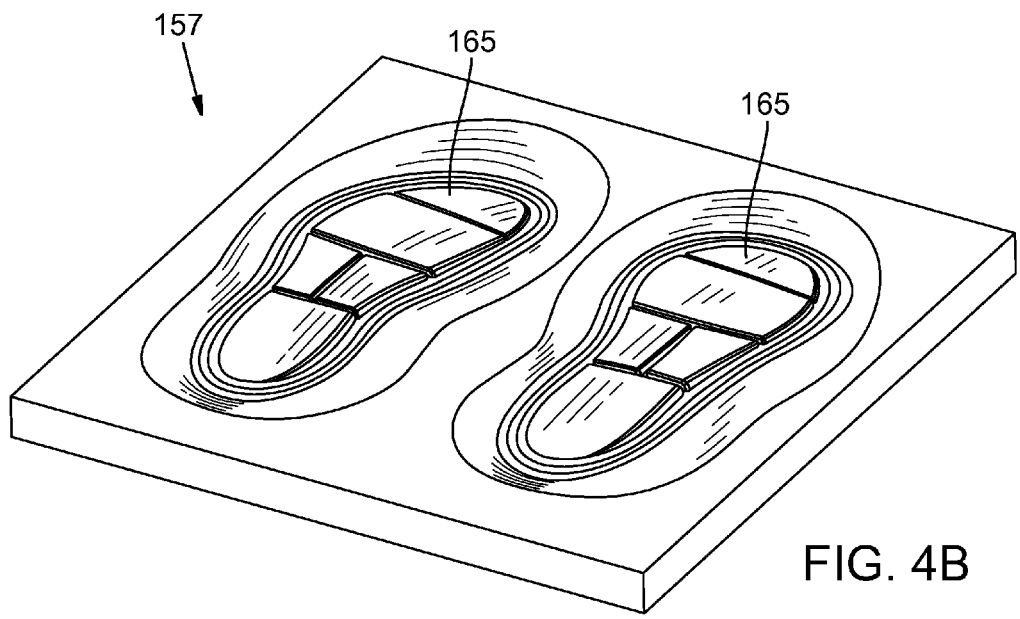
Figure 5:
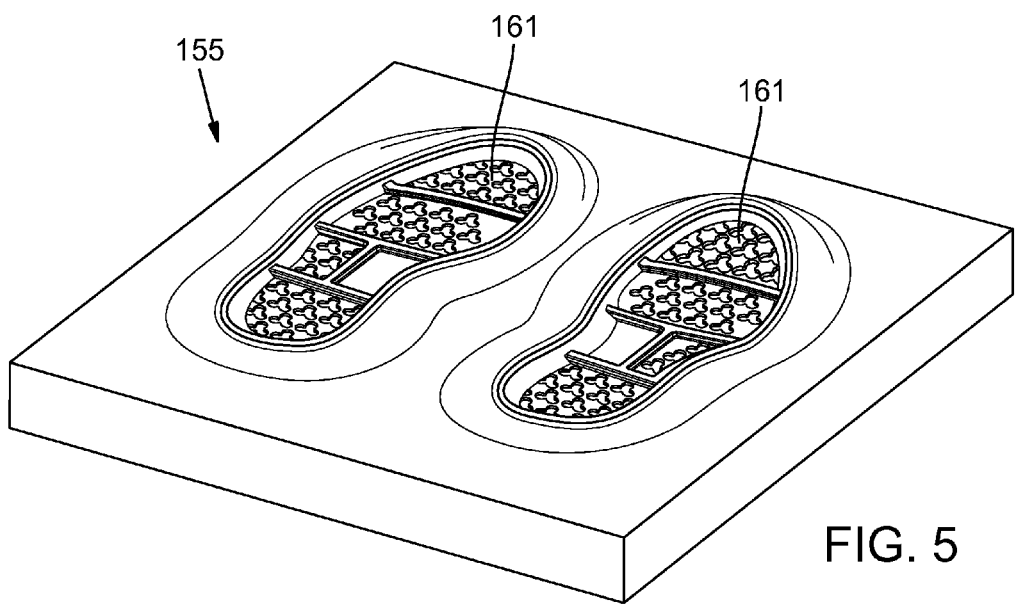
FIG. 5 is a top perspective view of a second mold member used to form the sole assembly of FIGS. 1A and 1B.
Figure 6A:
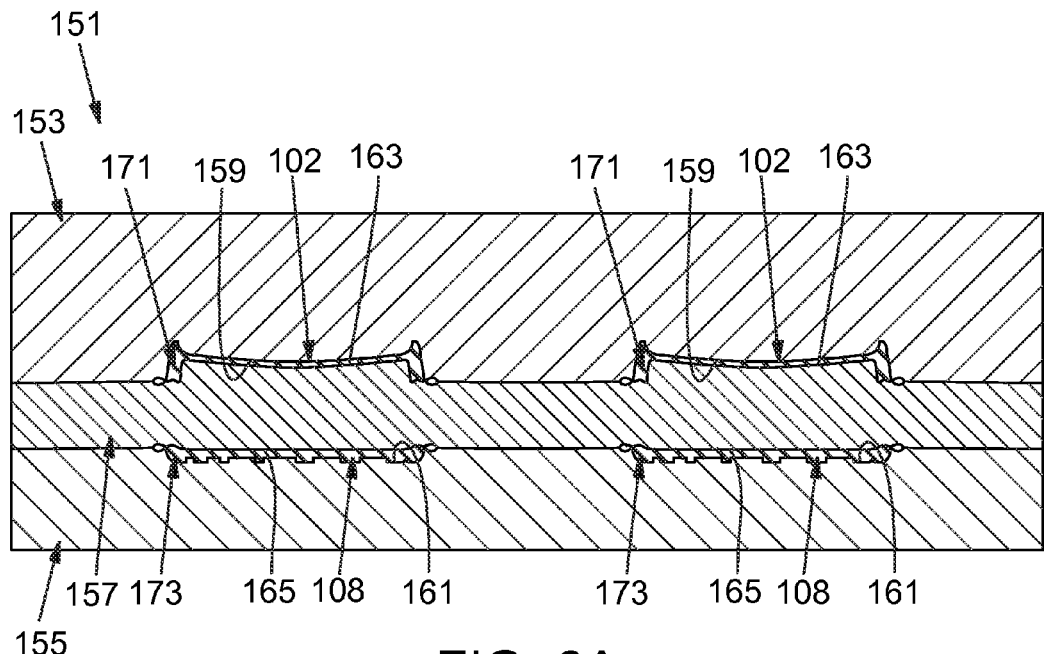
Figure 6B:
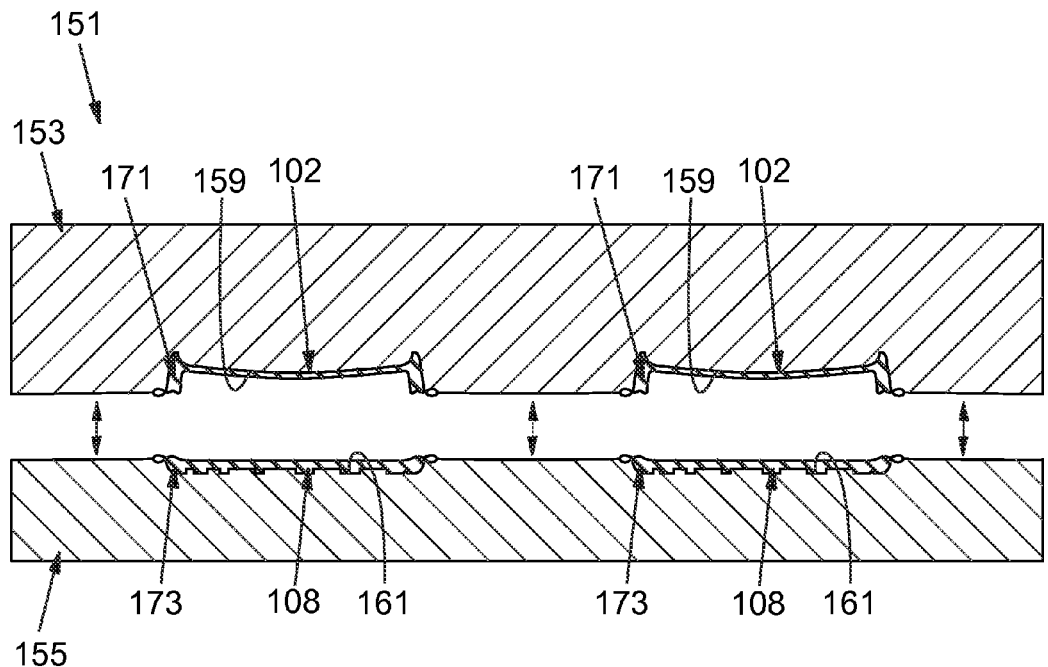

Referring now to FIGS. 3, 4A, 4B, 5, 6A, and 6B, various methods of manufacturing the sole assembly 100 will be discussed. In some embodiments, the first and second portions 102, 108 of the sole assembly 100 can be formed via molding (e.g., injection molding, etc.) in a mold assembly 151 (FIGS. 6A and 6B). Also, the first and second portions 102, 108 can be joined together via molding (e.g., compressive molding, etc.) within the same mold assembly 151. However, it will be appreciated that the first and second portions 102, 108 can be formed in any suitable fashion, and it will be appreciated that the first and second portions 102, 108 can be joined in any suitable fashion.

Figure 3:
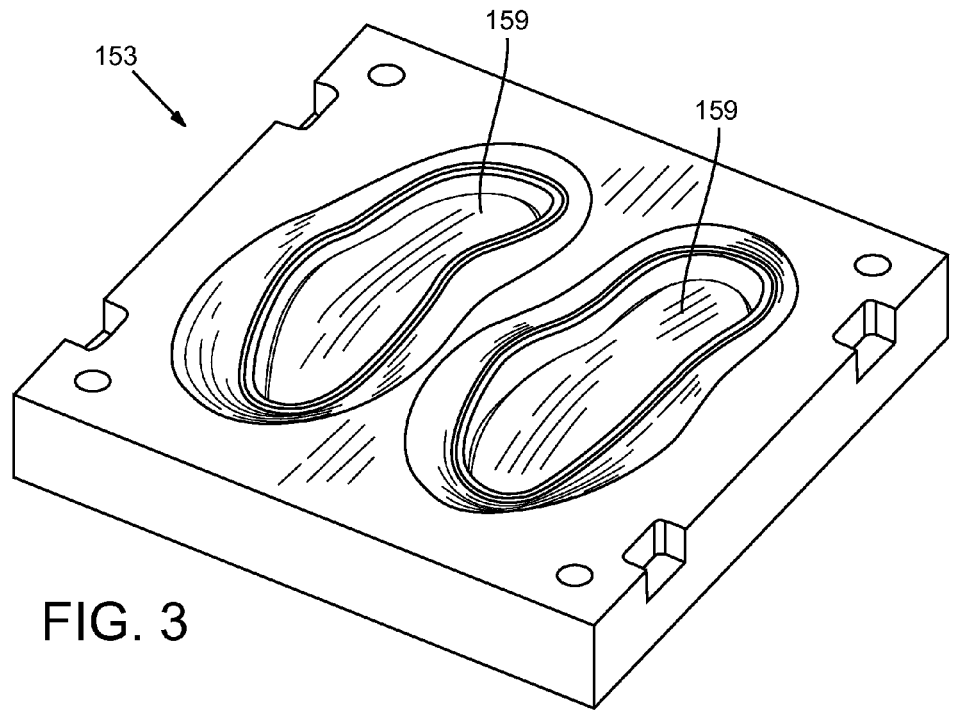
FIG. 3 is a bottom perspective view of a first mold member used to form the sole assembly of FIGS. 1A and 1B.

The mold assembly 151 can generally include a first mold member 153 (FIG. 3), a second mold member 155 (FIG. 5), and a middle mold member 157 (FIGS. 4A and 4B). In the embodiments illustrated, the mold members 153, 155, 157 can be used to form two sole assemblies 100 at once (e.g., a left and a right sole assembly 100); however, any number of sole assemblies 100 and any shape of sole assemblies 100 can be formed in the mold assembly 151.

The first mold member 153 can be a plate that includes one or more (e.g., two) first mold surfaces 159 as shown in FIG. 3. The first mold surfaces 159 can correspond in shape to the first surface 104 of the first portion 102 of the sole assembly 100.

The second mold member 155 can be a plate that includes one or more (e.g., two) second mold surfaces 161 as shown in FIG. 5. The second mold surfaces 161 can correspond in shape to the second surface 110 of the second portion 108 of the sole assembly 100.

The middle mold member 157 can be a plate that includes an upper mold surface 163 (FIG. 4A) and a lower mold surface 165 (FIG. 4B). The upper and lower mold surfaces 163, 165 can be disposed on opposite sides of the middle mold member 157. The upper mold surface 163 can correspond in shape to the first chamber surface 106 of the first portion 102 of the sole assembly 100, and the lower mold surface 165 can correspond in shape to the second chamber surface 112 of the second portion 108 of the sole assembly 100.

As shown in FIG. 6A, the molding process can include positioning and layering the mold members 153, 155, 157 over each other such that the middle mold member 157 is disposed between the first and second mold members 153, 155. As such, a first mold cavity 171 can be defined between the first mold surface 159 and the corresponding upper mold surface 163, and a second mold cavity 173 can be defined between the lower mold surface 165 and the corresponding second mold surface 161.

Then, material can flow into the first mold cavity 171 and the second mold cavity 173 to form the first portion 102 and the second portion 108. The injection of the material for making the first and second portions 102, 108 can occur substantially simultaneously. In some embodiments, the valve member 129 can be insert molded within the first mold cavity 171 with the first portion 102.

Subsequently, as shown in FIG. 6B, the middle mold member 157 can be removed from between the first and second mold members 153, 155. A vacuum source (not shown) can provide suction into the cavities 171, 173 to retain the first and second portions 102, 108 therein. Then, the first and/or second mold members 153, 155 can be moved toward the other, and the first and second portions 102, 108 can be secured together via compressive molding. The mold members 153, 155 can be heated to mold and cure the first and second portions 102, 108 together. In some embodiments, an adhesive can be introduced between the first and second portions 102, 108 within the mold assembly 151 before the first and second portions 102, 108 are compressed together. In additional embodiments, the first and second portions 102, 108 can also be vulcanized together. It will be appreciated that the chamber 114 can be pressurized to a predetermined pressure as a direct result of joining the first and second portions 102, 108 together.

It will be appreciated that the mold assembly 151 can include an actuator that actuates the first, second, and/or middle mold members 153, 155, 157 as discussed above. The actuator can actuate the mold members 153, 155, 157 pneumatically, hydraulically, via electric motors, etc.

Once the first and second portions 102, 108 are joined together, the resulting sole assembly 100 can be removed from the mold assembly 151. In some embodiments, additional outsole material (e.g., high friction material, etc.) is attached to portions of the second surface 110. Then, in some embodiments, the pressure inside the chamber 114 can be pressurized. Subsequently, the sole assembly 100 can be lasted to the upper 113 to substantially finish the article of footwear 115.

The sealed chamber 114 can be pressurized by any suitable source (e.g., a mechanical and/or electrical pump or any other source of fluid). The chamber 114 can be pressurized either manually or automatically. In additional examples, the pressurizing is performed at a retail location at which the articles of footwear 115. In yet another example, the pressurizing is performed by the wearer when desired. For instance the footwear 115 can be sold to the wearer with a pump (not shown), and the wearer can use the pump to pressurize the chamber 114 to a desired pressure and to re-pressurize the chamber 114 if fluid leaks from the chamber 114.

Accordingly, the sole assembly 100 can provide cushioned support and impact-attenuating properties because the chamber 114 is included therein. The sole assembly 100 can include fewer parts than sole assemblies having a midsole, an outsole, and a separate and independent bladder. Also, the sole assembly 100 can be manufactured more efficiently than existing sole assemblies with bladders.

Optional features may be additionally added to any of the aspects of the sole assemblies 100 described above. For example, the exemplary sole assembly 100 can include more than one valve assembly 129. The materials that comprise the sole assembly 100 may have any suitable color or appearance. Also, in some examples, the materials of the sole assembly are opaque and the sealed chamber 114 is hidden from view. In other examples, the materials of the sole assembly 100 or a portion thereof is transparent and the sealed chamber 114 is viewable from the exterior of the sole assembly 100.

Also, manufacturing of the sole assembly 100 can vary. In the embodiments discussed above, the first portion 102 and the second portion 108 are substantially simultaneously formed. In other examples, the first portion 102 and the second portion 108 are formed at different times in separate mold assemblies.

Similarly, individual elements or features of a particular aspect of the sole assembly 100 and article of footwear 115 are generally not limited to that particular aspect, but, where applicable, are interchangeable and can be used in a selected aspect, even if not specifically shown or described. The same also may be varied in many ways. Such variations are not to be regarded as a departure from the present disclosure, and all such modifications are intended to be included within the scope of the present disclosure.

We claim:

1. A method of making a sole structure having a chamber for an article of footwear, the method comprising:
    injecting a first material into a first cavity defined by a first mold and a second mold to form a first sole portion having a first base and a first projection extending from and surrounding a periphery of the first base, the first base including an inner surface, a first chamber surface disposed on an opposite side of the first base than the inner surface, at least one first rail projecting from the first chamber surface between a lateral side of the first base and a medial side of the first base and comprising an integral projection, and a valve extending through the integral projection and operable to selectively permit fluid flow through the first base between the inner surface and the chamber;
    injecting a second material different than the first material into a second cavity defined by the second mold and a third mold to form a second sole portion having a second base and a second projection extending from and surrounding a periphery of the second base, the second cavity disposed on an opposite side of the second mold than the first cavity;
    attaching the first sole portion and the second sole portion to define the chamber between the first sole portion and the second sole portion; and
    supplying fluid to the chamber through the valve.

2. The method of claim 1, wherein attaching the first sole portion and the second sole portion comprises:
    aligning the first sole portion and the second sole portion at the first projection and the second projection; and
    applying at least one of heat and compression to the first sole portion and the second sole portion.

3. The method of claim 2, further comprising applying an adhesive to at least one of the first sole portion and the second sole portion at a junction of the first sole portion and the second sole portion.

4. The method of claim 1, wherein attaching the first sole portion and the second sole portion comprises vulcanizing the first sole portion and the second sole portion together to secure the first sole portion to the second sole portion.

5. The method of claim 1, wherein injecting a first material into the first cavity includes injecting a first rubber material and injecting a second material into the second cavity includes injecting a second rubber material.

6. The method of claim 1, wherein injecting a first material into the first cavity includes injecting a foam material and injecting a second material into the second cavity includes injecting a rubber material.

7. The method of claim 1, wherein forming the second sole portion includes forming a second rail that extends from the second base and between a medial side of the second base to a lateral side of the second base.

8. The method of claim 7, wherein attaching the first sole portion and the second sole portion comprises:
    aligning the first rail and the second rail; and
    attaching the first rail to the second rail to separate the chamber into a first chamber portion and a second chamber portion.

9. The method of claim 8, further comprising forming an aperture through at least one of the first rail and the second rail to permit fluid communication between the first chamber portion and the second chamber portion via the at least one aperture.

10. The method of claim 8, further comprising fluidly isolating the first chamber portion and the second chamber portion from one another.

11. The method of claim 1, further comprising removing the second mold prior to attaching the first sole portion and the second sole portion.

12. A method of making a sole structure having a chamber for an article of footwear, the method comprising:
   injecting a first material into a first cavity defined by a first mold and a second mold to form a first sole portion having a first base and a first projection extending from and surrounding a periphery of the first base, the first base including an inner surface, a first chamber surface disposed on an opposite side of the first base than the inner surface, and at least one first rail projecting from the first chamber surface between a lateral side of the first base and a medial side of the first base and comprising an integral projection, and an aperture formed through the first base and the integral projection, the aperture extending between the inner surface and the chamber;
   providing a valve operable to selectively permit fluid flow through the aperture;
   injecting a second material different than the first material into a second cavity defined by the second mold and a third mold to form a second sole portion having a second base and a second projection extending from and surrounding a periphery of the second base, the second cavity disposed on an opposite side of the second mold than the first cavity;
   attaching the first sole portion and the second sole portion to define the chamber between the first sole portion and the second sole portion; and
   supplying fluid to the chamber through the aperture.

13. The method of claim 12, wherein attaching the first sole portion and the second sole portion comprises:
   removing the second mold after forming the first sole portion and the second sole portion;
   aligning the first sole portion and the second sole portion at the first projection and the second projection;
   compressing the first sole portion and the second sole portion between the first mold and the third mold to secure the first sole portion to the second sole portion.

14. The method of claim 13, further comprising applying heat to at least one of the first sole portion and the second sole portion prior to compressing the first sole portion and the second sole portion.

15. The method of claim 13, further comprising applying an adhesive to at least one of the first sole portion and the second sole portion prior to compressing the first sole portion and the second sole portion.

16. The method of claim 12, wherein injecting a first material into the first cavity includes injecting a foam material and injecting a second material into the second cavity includes injecting a rubber material.

17. The method of claim 12, wherein forming the second sole portion includes forming a second rail that extends from the second base and between a medial side of the second base to a lateral side of the second base.

18. The method of claim 17, wherein attaching the first sole portion and the second sole portion comprises:
   aligning the first rail and the second rail; and
   attaching the first rail to the second rail to separate the chamber into a first chamber portion and a second chamber portion.

19. The method of claim 18, further comprising forming an aperture through at least one of the first rail and the second rail to permit fluid communication between the first chamber portion and the second chamber portion via the at least one aperture.

20. The method of claim 18, further comprising fluidly isolating the first chamber portion and the second chamber portion from one another.

* * * * *